United States Patent
Smeets

[19]

[11] Patent Number: 6,157,371

[45] Date of Patent: *Dec. 5, 2000

[54] DATA PROCESSING SYSTEM PROVIDED WITH SOFT KEYBOARD THAT SHIFTS BETWEEN DIRECT AND INDIRECT CHARACTER

[75] Inventor: Joseph P. A. Smeets, Groningen, Netherlands

[73] Assignee: U.S. Philips Corporation, New York, N.Y.

[ * ] Notice: This patent issued on a continued prosecution application filed under 37 CFR 1.53(d), and is subject to the twenty year patent term provisions of 35 U.S.C. 154(a)(2).

[21] Appl. No.: 08/841,917

[22] Filed: Apr. 17, 1997

[30] Foreign Application Priority Data

Apr. 19, 1996 [EP] European Pat. Off. ............... 9620151

[51] Int. Cl.⁷ .................................... G09G 5/08
[52] U.S. Cl. ................... 345/168; 345/169; 345/173; 345/156
[58] Field of Search ................... 345/168, 169, 345/173, 156, 348, 349

[56] References Cited

U.S. PATENT DOCUMENTS

| | | |
|---|---|---|
| 5,008,847 | 4/1991 | Lapeyre .................. 364/709 |
| 5,105,375 | 4/1992 | Lapeyre .................. 708/146 |
| 5,303,388 | 4/1994 | Kreitman et al. ......... 395/159 |
| 5,452,414 | 9/1995 | Rosendhal et al. ....... 395/159 |
| 5,515,486 | 5/1996 | Amro et al. ............. 395/137 |
| 5,574,482 | 11/1996 | Niemeier ............... 345/173 |
| 5,717,425 | 2/1998 | Sasaki .................. 345/157 |
| 5,812,117 | 9/1998 | Moon .................... 345/169 |

FOREIGN PATENT DOCUMENTS

0547993A2 6/1993 European Pat. Off. ........ G06F 3/033

*Primary Examiner*—Dennis-Doon Chow
*Assistant Examiner*—Amr Awad
*Attorney, Agent, or Firm*—Gregory L. Thorne

[57] ABSTRACT

A data processing system includes a keyboard structure for a multi-character keyboard, and controls on-screen representing of the keyboard structure. A particular key may be activated through pointing, for subsequently presenting the associated key data to the system. A first subset of keyboard keys is selected for direct pointability. A second subset of keys is selected for adjacent representation to the first subset in a relatively less space-consuming format for subsequent indirect pointability. Through shifting, the selection controls substituting a second subset for the first subset, and inherently selects a third subset of keys for adjacent representation to the second set for subsequent indirect pointability.

17 Claims, 2 Drawing Sheets

THE 'CUBE' - KEYBOARD

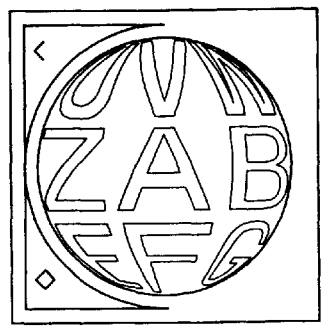
THE 'BALL' - KEYBOARD  FIG. 3
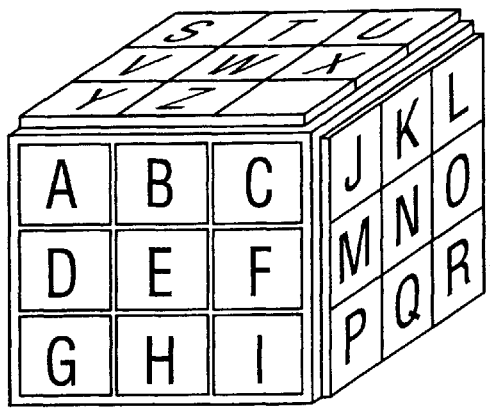
THE 'CUBE' - KEYBOARD  FIG. 4A
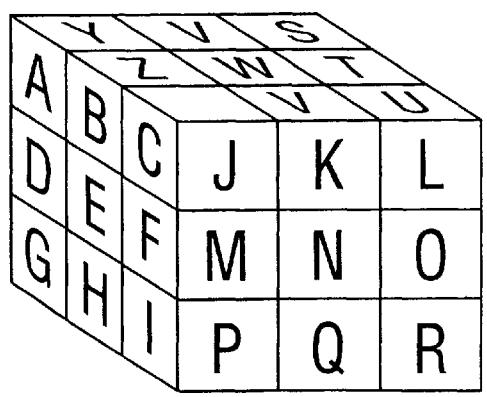
FIG. 4B
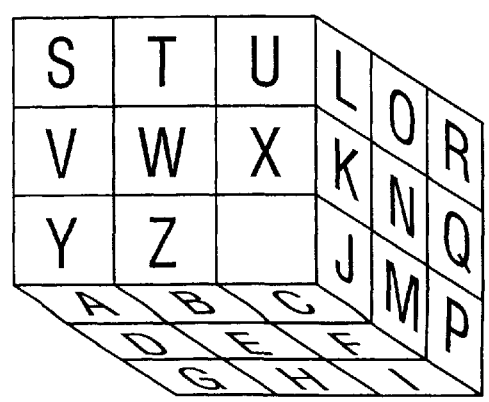
FIG. 4C

DATA PROCESSING SYSTEM PROVIDED WITH SOFT KEYBOARD THAT SHIFTS BETWEEN DIRECT AND INDIRECT CHARACTER

BACKGROUND TO THE INVENTION

The invention relates to a data processing system including

- a keyboard structure for a multi-character keyboard;
- a representation means for on-screen representing said keyboard structure,
- a user pointer for, through pointing, activating a particular keyboard key which will then associate key data to present the system;
- and a system-controlled selector means for selecting a first subset of keyboard keys for subsequent direct pointability.

Most data processing systems such as personal computers, are keyboard-oriented, in that they come provided with a hardware keyboard of the QWERTY or similar type, if the Latin or similar alphabet is used. Usually the keyboard is augmented with other keys such as space bar, control keys, numerical keys, and special function keys. However, many other data processing systems are more screen-oriented and have an on-screen representation of a so-called 'soft keyboard'. Actuating a key is then done by some pointing device, such as mouse, joystick, tracker ball, or even with non-computer devices, such as a pencil or a finger. If the number of keys is large, simultaneous representation of all keys takes much space on the screen that often must simultaneously show many other features, such as windows, pictures, text, and various other. The term data processing system is understood to include systems wherein the data are not changed, such as data entry systems, data storage systems, or data terminals. The multi-character keyboard would comprise a relatively large number of letter and/or digit keys, sometimes enhanced with control keys that expand the character or word processing functionality, such as punctuation marks, enter or delete keys, or additional non-character keys. Direct pointability of a key can be effected in various ways, such as through a pencil touching the screen, or by moving a cursor by means of a mouse and subsequently clicking a mouse button.

SUMMARY TO THE INVENTION

Therefore, amongst other things it is an object of the present invention of provide a data processing system according to the preamble with a representable soft keyboard that features a large number of actuatable keys, such as a whole Latin alphabet while leaving most of the screen free for other purposes. Now, according to one of its aspects, the invention has a selector which is operative for selecting a second subset of keyboard keys for adjacent representation to said first subset in a relatively less screenspace-consuming format for subsequent indirect pointability.

Further, the selector has a substitution unit for, under control of user-pointing, substitutively shifting the second subset in place of the first subset, while inherently selecting a third subset of keyboard keys associated to the second subset for adjacent representation to the second subset for subsequent indirect pointability in lieu of the shifted second subset.

The first subset of keys can be actuated immediately through pointing. By shifting the second subset to the position of the first subset, the second subset of keys can be actuated. This means that often entering of a key would require two or more actuations. In case only relatively few characters or other data needs to be inserted, the necessary time for multiple actuation per key is no disadvantage. The fact that non-directly actuatable keys consume relatively less space on the screen allows to reserve a larger screen part for other purposes.

Reference is had to earlier Patent Application EP 95203069.0, corresponding to U.S. Ser. No. 08/747,691 assigned to the present assignee, and herein incorporated by reference. The earlier system relates to function selection in an application, and has a plurality of function menus that may exchanged for each other. During selectability of a function, only a single menu is represented on screen. The present invention has various differences with respect thereto:

- it relates to a primarily character-oriented keyboard,
- various indirectly pointable characters are visible
- thereby, various subsets together constitute an overall set,
- the representation effects a feed-forward mechanism,
- the present format has a high degree of immediate expectancy
- the format allows two-dimensional stepping between subsets, and
- user actions are largely uniform among various subsets.

Advantageously, the selector is operative for allowing selecting among a plurality of co-existent said second subsets that are each associated with a respective unique said third subset. This causes a selecting structure that has shallow depth: only a few successive user actions are sufficient to present any particular key data to the system.

Advantageously, said shifting is effected through first degree user pointing, whereas presenting is effected through second degree user pointing. If various different degrees of pointing are envisaged, this raises ease of use. For example, first degree can be effected by moving of a cursor to the area in question, whereas second degree can then be effectively clicking.

Advantageously, all keyboard keys form a repetitive two-dimensional layout, and a plurality of second subsets are contained in a two-dimensionally arranged fourth subset around the first subset. The first and fourth subset combined contain less than all actuatable keys. This setup allows a user to quickly ascertain where a non-represented key is located most closely, because the repetitivity is two-dimensional. In particular for key sets that contain only alphabet keys, and as the case may be, also the ten digit keys, the user will be able to select the direction along which to navigate in the two-dimensional setup. The alphabetic keys are advantageously arranged according to a pattern that is felt most natural by a user. A particularly user-friendly arrangement including the layout includes multiple parallel alphabet rows that are staggered with respect to each other, and shifting is allowed in at least four coordinate directions.

Advantageously, all characters are simultaneously visibly represented, and are grouped into a plurality of groups in a persistent and unique manner, which groups exchange by way of said first, second, and third subsets. Users have felt this a simple organization for use in various environments.

Advantageously, the groups are mapped on respective sides of a polyhedron that is represented in a quasi-three-dimensional manner. The persistent visibility of all characters makes the choosing among them extremely straightforward. Yet the keyboard takes about half of the space that would be necessary in a standard format. Various further advantageous aspects of the invention are recited in dependent Claims.

BRIEF DESCRIPTION OF THE DRAWINGS

These and other aspects and advantages of the invention will be discussed hereinafter more in detail with reference to the disclosure of preferred embodiments, and more in particular with reference to the appended Figures that show:

FIG. 3, a representation of the above first keyboard; and

FIGS. 4A–4C, a representation of another keyboard structure.

DESCRIPTION OF PREFERRED EMBODIMENTS

Figures 1, 2:
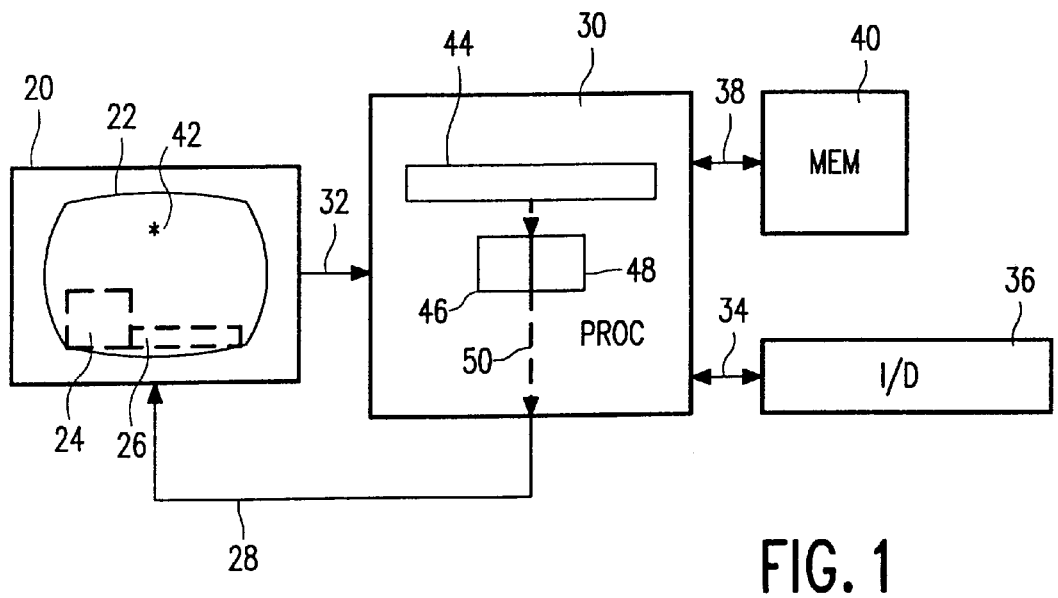
FIG. 1, a data processing system according to the invention.
FIG. 2, a first keyboard structure of the invention.

FIG. 1 shows a data processing system according to the invention. The central element is processor 30 that via line 38 is connected to external memory 40, which may be RAM, floppy drive, optical disc drive or other. The processor via line 28 feeds video display 20 with video signals for effecting a display on screen 22. Further I/O devices, such as for example, a speech channel, hardware keys, or a cursor controller are symbolized by block 36 interconnected via line 34. As shown, screen 22 has an on-screen field 24 for representing all or part of a keyboard structure. Layout and operation embodiments will be discussed with reference to the further Figures. Further screen field 26 can be used for representing a line of text, such as may have been developed by successive key actuations through field 24. A cursor representation has been indicated by item 42. Block 44 internal to the processor 30 symbolizes a keyboard structure, such as the relative locations of the various keys with respect to each other, that may be stored in appropriate internal memory locations of the processor. Of the keys so stored, a first subset is selected as symbolized in block 46, and one or more second subsets are selected as symbolized in block 48. The character shapes thereof for representation of screen 22 are sent via line 50 for being included in the overall screen image. By itself, the representation of particular keys in appropriate areas of a display screen is standard technology and will not be discussed in detail. The remainder of the display is application-specific and irrelevant for the disclosure of the present invention.

The pointing on a particular character in field 24 may be effected in various ways. A first one is by controlling cursor 42 to go to the wanted character, and subsequently actuating that character by a single actuation button, such as on I/O device 36. A second one is by pointing with a finger or other appropriate object, such as a stylus, to the intended character. This pointing may be detected by a special overlay device to the screen (not shown) which sends an associated position detection signal to the processor. Various pointing methodologies are known in the art.

FIG. 2 shows a first keyboard structure according to the invention. All keyboard keys form a repetitive two-dimensional layout 21, in that each line carries the whole alphabet of 26 characters in the standard sequence. Along the line, the pattern can repeat periodically after 26 positions. Successive rows are staggered by five character positions as shown. For simplicity, only six rows have been depicted, but the height may in principle be infinitely repeating in the vertical direction as well. If further characters are to be used, such as numerals or interpunction marks, these can be joined at the end of each alphabet in a uniform order. The processor memory stores, apart from a single representation of the alphabet, the transposition function between characters, thereby allowing to select the various character subsets for representation.

In a preferred embodiment, the first subset 23 is actually representing a single character U. The fourth subset 25 contains characters O P Q T V Y Z A, each single character of which forms a respective second subset. In another embodiment, the various second subsets may only contain characters P T V Z. In addition to the characters that collectively form the various second subsets, further characters may be represented in a more or less screenspace consuming manner, as will be shown in FIG. 3. Presenting of the data thereof to the processor will need still more actions than the indirect pointability of the second subsets of keys requires. Character U may be pointed directly, such as discussed supra, either by clicking, or only by moving the cursor to the field of this character. Pointing a character of the second subset, such as character T, will shift that character to the central position of the first subset, while centring new second subsets of eight or four characters, respectively, encircling the T. Therefore, presenting a character T to the processor will cost two actuations, just as will the presenting of characters P V Z. Pointing O Q Y A will cost two or three actuations, depending on whether diagonal shifting is allowed or not. Going from U to J while avoiding diagonal shifts will then require three shifts (up, up, left, or alternatively down, down, down). The user's knowledge of the alphabetic sequence will allow to straightforwardly determine the shortest path. In the embodiment, the stagger is by five positions; another advantageous stagger would be by six positions. The optimum stagger depends on the number of characters in the total set or the user preference for vertical or horizontal shifting.

FIG. 3 shows a representation of the above first keyboard as imaged on the screen. As shown, character A is now the first subset, whereas the characters of the second subsets are shown as if they were printed on the surface of a ball that has an apparent diameter of somewhat more than the character field of the A. This means that the shifting is realized as a metaphor of the well-known tracker-ball input device. Of course, the surface of the ball as shown would by far not accommodate the placement of all characters of the set, but then, the ball is only metaphoric and differential. In another embodiment, the first subset can contain more than one character, as will be discussed more in detail with reference to FIGS. 4A–4C.

FIGS. 4A–4C are three different representations of a second keyboard structure. The starting position is FIG. 4A, wherein the first nine characters as the first subset are represented on the front side of a quasi-three-dimensional cube. The other 17 characters are represented on the two other visible sides of the cube, that in quasi-three-dimensional representation each take less place on the screen than does the front side of the cube. In this manner, all of these nine characters on the front side may be directly pointed at. If however, the first pointing is effected at one of the two other sides of the cube, this side shifts to the front, as if the cube were rotated: this is shown in FIGS. 4B, 4C, respectively. Throughout, the characters are as far as possible represented in their natural position. The embodiment as shown has three different images; in principle, this number may be greater. For example, pointing in FIG. 4B at the upper face cube may bring about the image of FIG. 4C. Another consequence could be that the former front face of the cube becomes the lower face, whereas the remaining face becomes the left hand face. This also implies that the spatial sequence among the characters of a first subset is not always the same. The single square not filled by a character may be used as a space character, as an 'enter' or validate key, or in some other manner. Particular character sequences may, otherwise than being used as such, in a word or sentence, represent a control signal, such as XX or YY. Extending the formats shown with numeric or control keys is straightforward. In another realization, the overall set can consist of numeric digits only.

What is claimed is:

1. A data processing system comprising:
   a keyboard structure for a multi-character keyboard having a plurality of keys;
   representation device configured for on-screen representation of said keyboard structure;
   selector configured for activating a particular keyboard key; and
   substitution device configured for
      selecting a first subset of keyboard keys for direct selection of a particular key by said selector and thereby presenting associated key data to said data processing system,
      selecting a second subset of keyboard keys for simultaneous on-screen representation with said first subset for indirect selection, and
      substitutively shifting said second subset in place of said first subset if user selection is of one of said second subset, wherein said second subset are first substituted by said substitution device before said second subset are directly selectable.

2. A system as claimed in claim 1, wherein said selector means are operative for allowing selecting among a plurality of co-existent said second subsets that are each associated with a respective unique said third subset.

3. A system as claimed in claim 1, wherein said shifting is effected through user pointing on an area associated to the second subset in question.

4. A system as claimed in claim 1, wherein said shifting is effected through first degree user pointing, and said presenting is effected through second degree user pointing.

5. A system as claimed in claim 1, wherein the number of coexistent second subsets is at least equal to four.

6. A system as claimed in claim 1 for use with exclusively alphabetic keys.

7. A system as claimed in any of claim 1, wherein: all keyboard keys form a repetitive two-dimensional layout, and
   a plurality of second subsets are contained in a two-dimensionally arranged fourth subset around said first subset,
   said first and fourth subset combined containing less than all actuatable keys.

8. A system as claimed in claim 7, wherein said first subset is formed from a single key.

9. A system as claimed in claim 7, wherein said layout comprises multiple parallel alphabet rows that are staggered with respect to each other, and
   said shifting is allowed in at least four coordinate directions.

10. A system as claimed in claim 9, wherein adjacent rows are staggered over a uniform plurality of character positions.

11. A system as claimed in claim 1, wherein all characters are simultaneously visibly represented.

12. A system as claimed in claim 1, wherein of said keyboard characters are grouped into a plurality of groups in a persistent and unique manner, which groups exchange by way of said first, second, and third subsets.

13. A system as claimed in claim 12, wherein said groups are mapped on respective sides of a polyhedron that is represented in a quasi-three-dimensional manner.

14. A system as claimed in claim 13, wherein said polyhedron is regular.

15. A system as claimed in claim 14, wherein said polyhedron is a cube, and all key representations are represented permanently.

16. A system as claimed in claim 12, wherein the number of said groups is three, each consisting of 3×3 keys.

17. The data processing device of claim 1, wherein said substitution device is configured to substitutively shift a third subset of keyboard keys associated to said second subset in place of said second subset for simultaneous on-screen representation with said second subset for indirect selection if user selection is of one of said second subset.

* * * * *